(12) United States Patent
Wilkinson et al.

(10) Patent No.: US 7,194,814 B2
(45) Date of Patent: Mar. 27, 2007

(54) SELF-BALANCING, NO-SPIN MAGNET COMPASS

(75) Inventors: Bruce S. Wilkinson, Gloucester, MA (US); Yu-Feng Wei, Carlisle, MA (US); Scott K. Batchelder, Newbury, MA (US)

(73) Assignee: Rule Industries, Inc., Gloucester, MA (US)

( * ) Notice: Subject to any disclaimer, the term of this patent is extended or adjusted under 35 U.S.C. 154(b) by 0 days.

(21) Appl. No.: 10/851,082

(22) Filed: May 24, 2004

(65) Prior Publication Data

US 2005/0005464 A1   Jan. 13, 2005

Related U.S. Application Data

(60) Provisional application No. 60/476,371, filed on Jun. 9, 2003, provisional application No. 60/472,746, filed on May 23, 2003.

(51) Int. Cl.
*G01C 17/00* (2006.01)
*G01C 17/08* (2006.01)

(52) U.S. Cl. .................. 33/355 R; 33/364; 33/1 E; 33/355 D

(58) Field of Classification Search .......... 33/355 R, 33/1 E, 344, 346, 364, 355 D
See application file for complete search history.

(56) References Cited

U.S. PATENT DOCUMENTS

| | | | | |
|---|---|---|---|---|
| 1,424,804 | A * | 8/1922 | Day ..................... | 33/364 |
| 2,389,664 | A * | 11/1945 | Giannini ............... | 33/346 |
| 2,428,346 | A * | 9/1947 | White .................. | 33/346 |
| 2,552,332 | A * | 5/1951 | Le Van ................. | 33/345 |
| 3,023,512 | A * | 3/1962 | Morris et al. .......... | 33/378 |
| 3,568,329 | A * | 3/1971 | Campbell .............. | 33/364 |
| 3,690,014 | A * | 9/1972 | Giltzow ............... | 33/346 |
| 3,805,400 | A * | 4/1974 | Giltzow et al. ........ | 33/364 |
| 4,027,398 | A * | 6/1977 | Fowler et al. ......... | 33/363 K |
| 4,089,118 | A * | 5/1978 | Howard ................. | 33/349 |
| 4,141,152 | A * | 2/1979 | White .................. | 33/355 R |
| 4,357,756 | A * | 11/1982 | DeGaeta et al. ........ | 33/355 R |
| 4,571,843 | A * | 2/1986 | Lindskog .............. | 33/355 R |
| 4,601,106 | A * | 7/1986 | Leinonen .............. | 33/356 |
| 4,671,120 | A * | 6/1987 | Fowler ................ | 73/291 |
| 4,930,224 | A * | 6/1990 | LeBlanc ............... | 33/355 D |
| 6,094,830 | A * | 8/2000 | Gloor et al. .......... | 33/364 |
| 6,105,265 | A * | 8/2000 | Gloor et al. .......... | 33/355 R |
| 6,430,825 | B1 * | 8/2002 | Baumann ............... | 33/355 R |
| 6,665,944 | B1 | 12/2003 | Wei et al. | |

* cited by examiner

FOREIGN PATENT DOCUMENTS

GB          2002901 A *  2/1979

OTHER PUBLICATIONS

International Search Report and Written Opinion of the International Searching Authority.

*Primary Examiner*—Diego Gutierrez
*Assistant Examiner*—Amy R. Cohen
(74) *Attorney, Agent, or Firm*—Dickstein Shapiro LLP

(57) ABSTRACT

A self-balancing, no-spin magnetic compass. A described embodiment includes a compass card assembly, a retainer assembly, a pivot assembly, a gimbal assembly, a cup, and a dome. The compass card assembly includes an air chamber which provides buoyancy. The retainer assembly functions with the compass card assembly to retain magnets. The pivot assembly snap-fits into the retaining assembly and contacts the compass card assembly to allow the compass card assembly to pivot about the pivot assembly. The pivot assembly also snap-fits into the gimbal assembly. The base of the pivot assembly is positioned into the cup and the entire compass is secured into the dome, that is filled with a fluid.

20 Claims, 9 Drawing Sheets

LINES OF EQUAL DIP FOR 1965

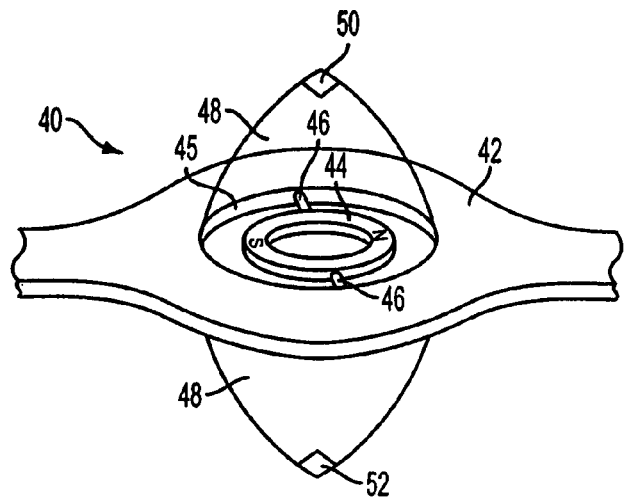
FIG. 4A
PRIOR ART
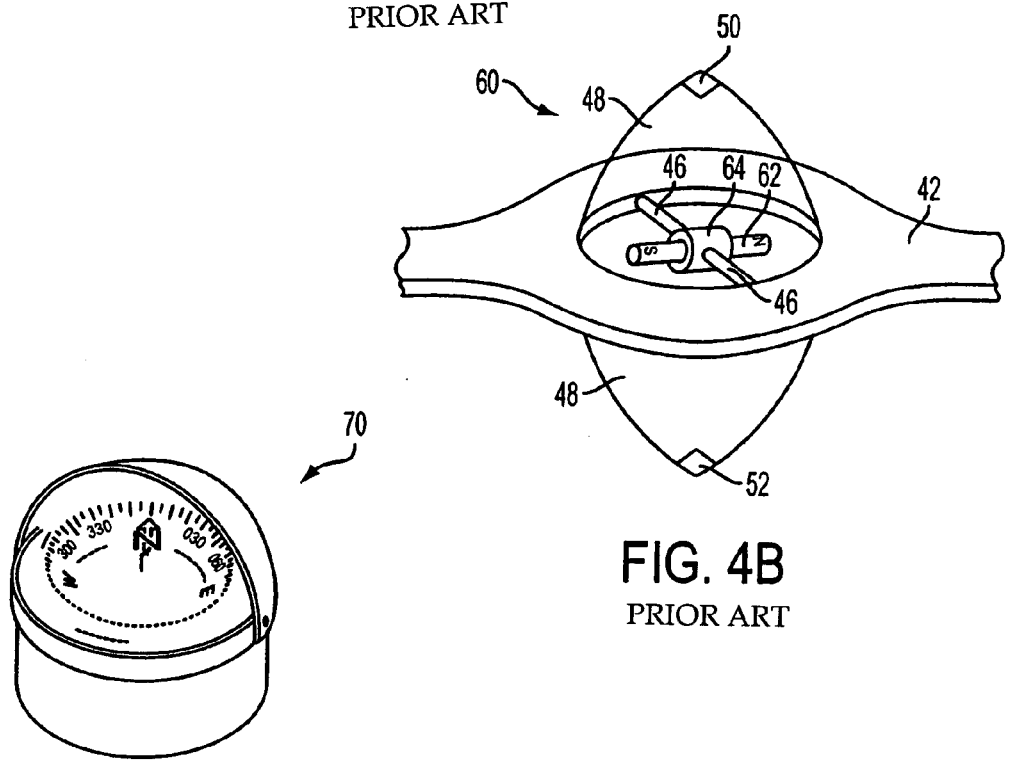
FIG. 4B
PRIOR ART
FIG. 5
PRIOR ART

SELF-BALANCING, NO-SPIN MAGNET COMPASS

This application claims the benefit of U.S. Provisional Application No. 60/472,746, filed on May 23, 2003, and U.S. Provisional Application No. 60/476,371, filed on Jun. 9, 2003, the entireties of which are incorporated herein by reference.

FIELD OF THE INVENTION

The invention generally relates to magnetic marine compasses and more particularly to magnetic marine compasses that have self-balancing and no-spin characteristics.

BACKGROUND

Land-based and marine compasses all need to handle the issue of dip. In certain locations in the globe, due to the position of the compass relative to the north and south poles, the magnet used in compasses will dip toward or away from the ground. FIG. 1 illustrates the phenomenon of dip. Typical magnetic compasses include a magnet coupled with a compass card. As noted above, at certain latitudes the magnet, and hence the compass card, dip. Specifically, FIG. 1 shows a two-dimensional representation 10 of a portion of the globe with latitude lines 12, 14 and 16. For traditional magnetic compasses, the magnet and the compass card 18 are pivotably mounted on a pin 19, dip downwardly in areas around latitude line 12, and dip upwardly in areas around latitude 16. Around the equator, latitude line 14, the magnet and compass card 18 dip imperceptibly or not at all. If the dip in certain latitudes is too pronounced, the compass card 18 will be at such an angle that viewing the numbers on the card is rendered difficult. FIG. 2 shows a more realistic representation of lines of equal dip 24 found on the globe.

Decoupling the magnet from the card is one attempt to introduce self-balancing to compasses. Referring to FIG. 1, a compass card 20 does not dip at latitude lines 12 and 14, but a decoupled magnet 22 does. There are numerous commercially available magnetic compasses with the magnet decoupled from the card. One type is an orienteering magnetic compass. Such a compass is generally used on land by hikers and others to orient themselves with their environment. One manufacturer of orienteering magnetic compasses is Suunto, of Finland, which makes the MC-2G global compass (FIGS. 4a and 4b). As shown in FIG. 4a, the orienteering compass 40 includes a compass card 42, a magnet 44, a magnet holder 45 with trunnions 46, a card case 48, and a pair of jewels 50, 52. The magnet holder 45 encircles the bar magnet 44 and the trunnions 46 hold the magnet 44 to the card 42. The jewels 50, 52 allow the card 42 and magnet 44 to freely swing. FIG. 4b shows an alternative orienteering compass 60 that includes a bar magnet 62 held to the card 42 via trunnions 46 extending from a magnet holder 64.

An advantage to the orienteering magnetic compasses 40 and 60 is that the magnet 44, 62 is decoupled from the card 42. There are several disadvantages in the use of orienteering compasses in marine environments. One major disadvantage is that to properly function, orienteering compasses must be level, which severely impacts their ability to be used in marine environments. Since orienteering compasses are virtually only land-use compasses, their manufacture is less robust than the manufacture of marine compasses. A marine compass having a card decoupled from a magnet is described in U.S. Pat. No. 6,665,944, which is incorporated in its entirety by reference herein.

Another form of magnetic compass is a manual-balance type. This type of compass is properly balanced to function within a certain magnetic latitude. Weight is added to the compass card to level the card. However, manual balancing of compasses is labor intensive and time consuming. Further, such manually balanced compasses are capable of functioning in only a limited part of the world.

Another type of magnetic compass is a counter-weight type, which utilizes the weight of the compass card itself to counter the dipping magnetic force and maintain the dipping angle within an acceptable range. One manufacturer of counter-weight types of compasses is C. Plath, which makes the Venus® compass 70 (FIG. 5). The Venus® compass 70 lessens the dipping by lowering the magnet from the pivot point of the compass card. Thus, the weight of the magnet compensates for the vertical magnetic force causing the dip and allows the card to reach an equilibrium dipping angle with is generally smaller than would have occurred otherwise.

One disadvantage with the conventional counter-weight type of compass is that to provide sufficient moment for the weight of the magnet to counter-balance the dipping force, the magnet must be moved a fairly substantial distance from the pivot point of the card. Referring to FIG. 3, the equilibrium equation for a compass card is:

$$M=(W)(d)(\sin \theta)$$

where M is the vertical geomagnetic couple or moment, W is the weight of the compass card assembly, d is the depth of the center of gravity, and $\theta$ is the dip angle of the compass card. Thus, to move the depth d of the center of gravity Cg of the compass card assembly 30 (including a card 32 and a magnet 34 which pivot about pivot point P), the magnet 34 must be moved away from the card 32. Such compasses must be taller than other compasses, which adds manufacturing costs and prevents such compasses from being placed in certain locations with limited height.

Another significant issue regarding the use of compasses is that compasses used in marine environments invariably encounter spin. Virtually all compass cards spin under some horizontal vibration frequencies, which are encountered when compasses are mounted on powered vehicles, such as automobiles or motorized boats. The difference in inertia between the compass card and fluid within which the compass card is positioned causes relative movement. The relative movement in turn causes contact at the pivot point that leads to friction that drags the compass card in a circular path. Ultimately, the compass card will spin resonantly at some vibration frequencies. Spinning of compass cards inhibits users from properly reading the orientation from the compass.

Rule Industries, Inc., the assignee of this patent application, manufactures compasses which exhibit no-spin characteristics due to a nearly neutral-buoyant compass card within the compass fluid. The near neutral-buoyancy reduces the contact between the compass card and the pivot that causes circular dragging under vibration. The compasses, however, lack the ability to self-balance. There are no compasses that exhibit the characteristics of no-spin and self-balance.

SUMMARY

The invention provides a no spin, self-balancing marine compass through an improved counter-weight design.

These and other advantages and features of the invention will be more readily understood from the following detailed description of the invention that is provided in connection with the accompanying drawings.

BRIEF DESCRIPTION OF THE DRAWINGS

FIG. 4a illustrates a conventional orienteering compass.

FIG. 4b illustrates another conventional orienteering compass.

FIG. 5 illustrates a conventional counter-weight type of marine compass.

DETAILED DESCRIPTION OF PREFERRED EMBODIMENTS

Figure 1:
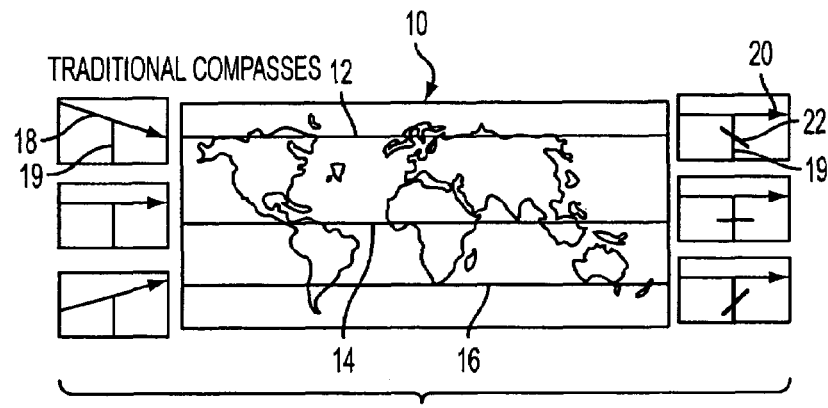
FIG. 1 illustrates the concept of magnetic dip at various latitudes.
Figure 3:
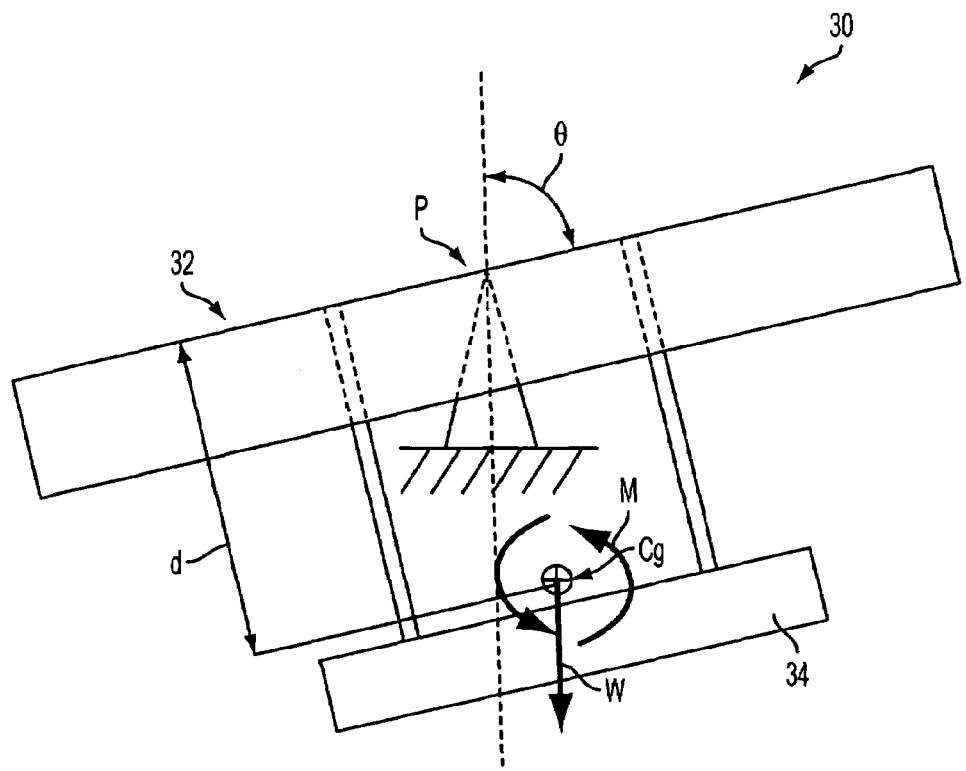
FIG. 3 is a schematic representation of a magnetic card compass in use and exhibiting magnetic dip.
Figure 2:
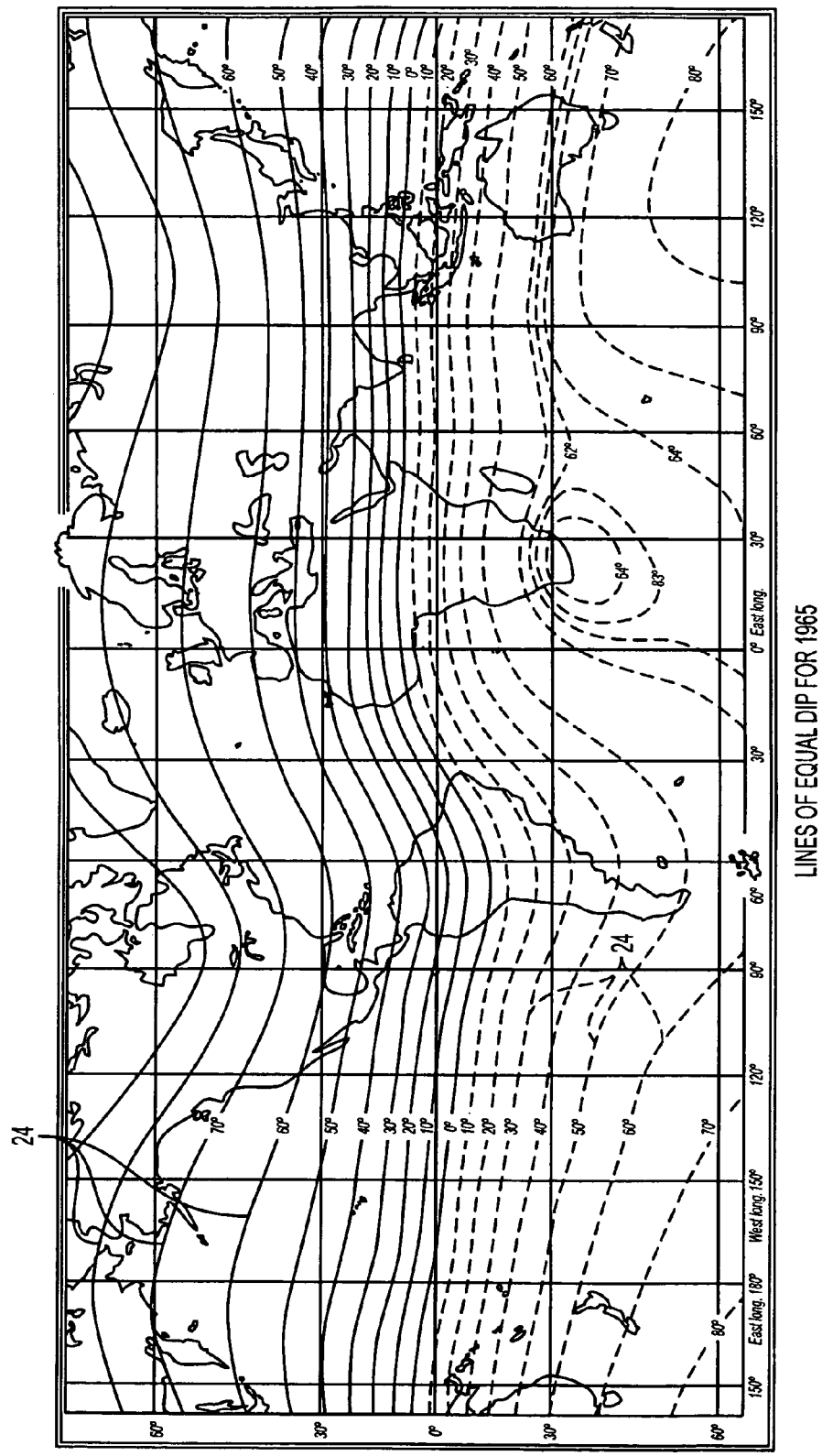
FIG. 2 more specifically illustrates that magnetic dip varies across the globe.

With specific reference to FIGS. 6–9, in which like reference numerals refer to like elements, a compass card assembly 100 is illustrated. The compass card assembly 100 includes an upper card 102 and a lower card 114. The upper card 102 includes a wing 104, on which dial readings 106 are located, and an inclined section 108 extending from the wing 104 to an apex 110. A plane of tilt $P_T$ extends substantially horizontal to the wing 104. The inclined section 108 preferably has an inclination angle $\alpha_H$ (FIG. 8) at about 15 degrees from the horizon, so that dial reading is not obstructed while also providing an effective flotation-to-weight ratio to the compass card assembly 100. Extending downwardly from the wing 104 is a first flange 112.

The lower card 114 includes a base 118 from which a second flange 116 extends. The second flange 116 fits within the first flange 112 such that a sealed joint 130 (FIG. 8) may be formed there between. The inclined section 108, the base 118 and the second flange 116 forms a boundary for an air chamber 128. The base 118 includes a cone section 120 having a cavity 122. Extending downwardly from the base 118 are protrusions 124 and a pair of hooks 126.

Also shown in FIGS. 6–9 is a retaining assembly 134 and a pivot assembly 148. The retaining assembly 134 includes a base 136, a skirt 138, and a plurality of retainers 142. A pair of magnets 132 are positioned on the base 136 and held in position by the protrusions 124 and the retainers 142. The magnets 132 orient the compass card assembly 100. The illustrated skirt 138 has a pair of opposing long walls and a pair of opposing short walls, the combination of walls forming a chamber 144. The base 136 further includes a frusticonical section 146 which leads to the chamber 144. An opening 140 extends through the base 136 adjacent each of the short walls. The retaining assembly 134 is connected to the compass card assembly 100 by latching the hooks 126 into the openings 140.

The pivot assembly 148 includes a pivot bar 150. At one end of the pivot bar 150 is a cone 152 and at the other end is a pair of latches 160. The cone 152 widens down to a ledge 156. Positioned between the ledge 156 and the latches 160 is a conic portion 158. The pivot assembly 148 fits within the retaining assembly 134 such that the cone 152 fits within the cavity 122. The tip of the cone 152 is near the pivot point 154, the point where the plane of tilt $P_T$ crosses the axis of rotation $A_R$. The ledge 156 fits within the chamber 144. The short walls of the skirt 138 allow the compass card assembly 100 to pivot about the pivot assembly 148, the cone 152 being configured and sized to allow the ledge 156 to clear the short walls of the skirt 138. The ledge 156 is larger than the smallest diameter of the frusticonical section 146, such that the ledge 156 causes the frusticonical section 146 to flex outwardly as the ledge 156 is pushed up into the chamber 144. An axis of rotation $A_R$ extends through the pivot assembly 134.

Figure 6:
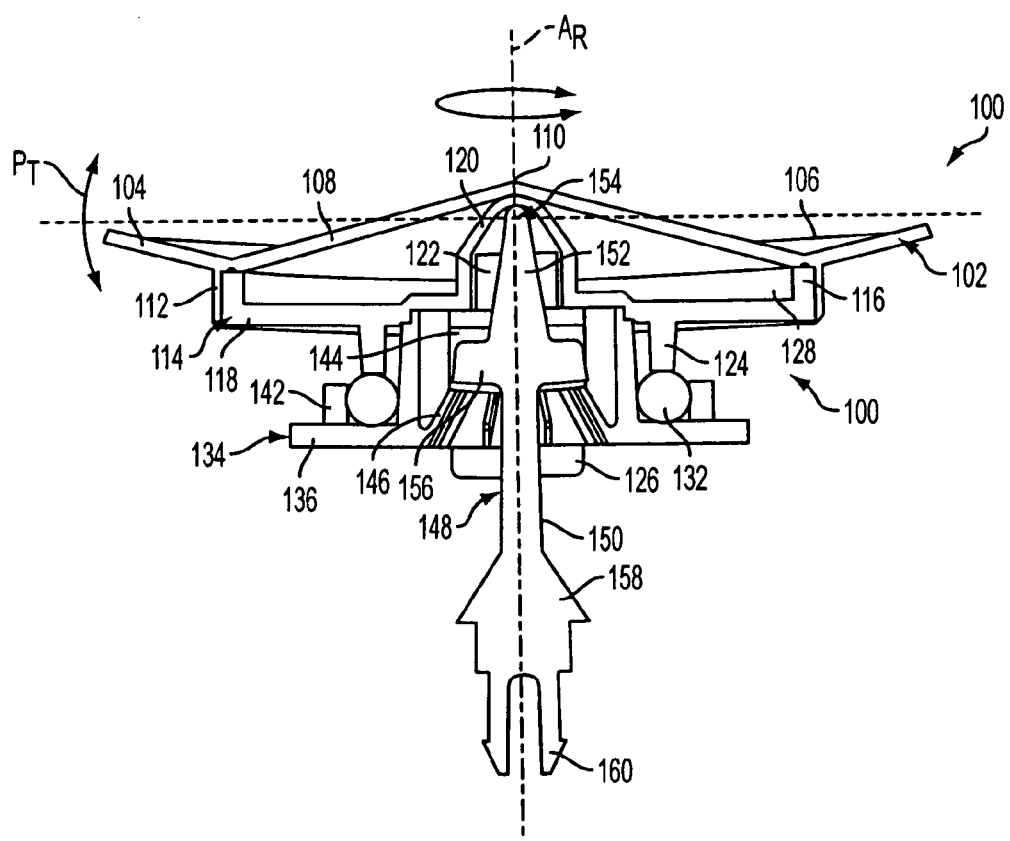
FIG. 6 is a cross-sectional view of a compass card and pivot bar constructed in accordance with an exemplary embodiment of the invention.
Figure 7:
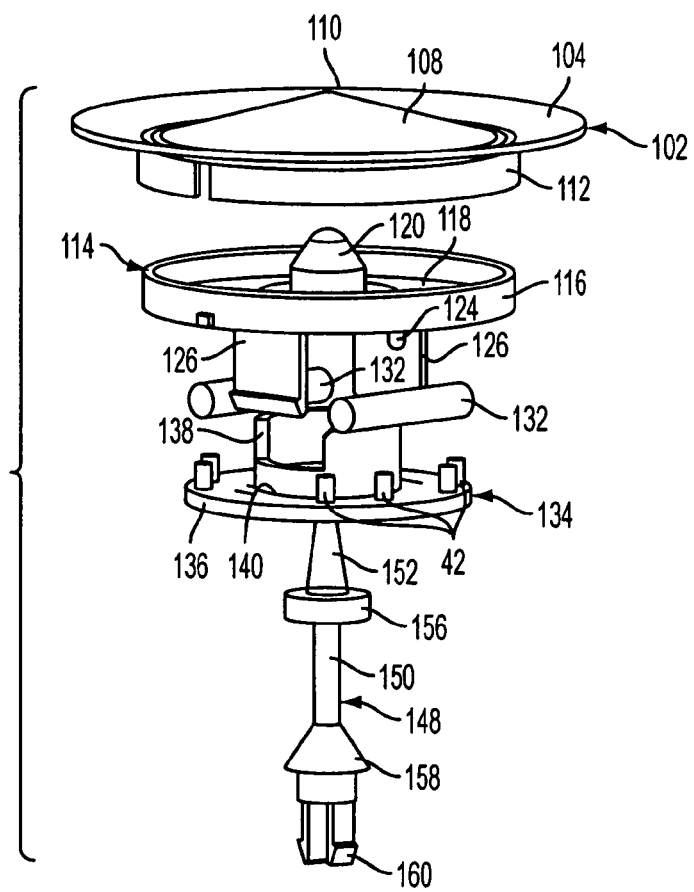
FIG. 7 is an exploded perspective view illustrating the compass card and pivot bar of FIG. 6.
Figure 8:
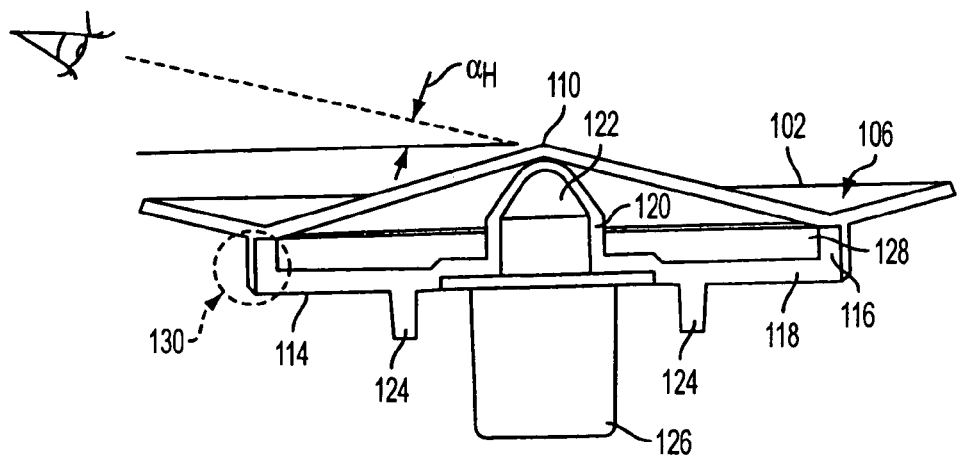
FIG. 8 is a cross-sectional view of the compass card of FIG. 6.
Figure 9:
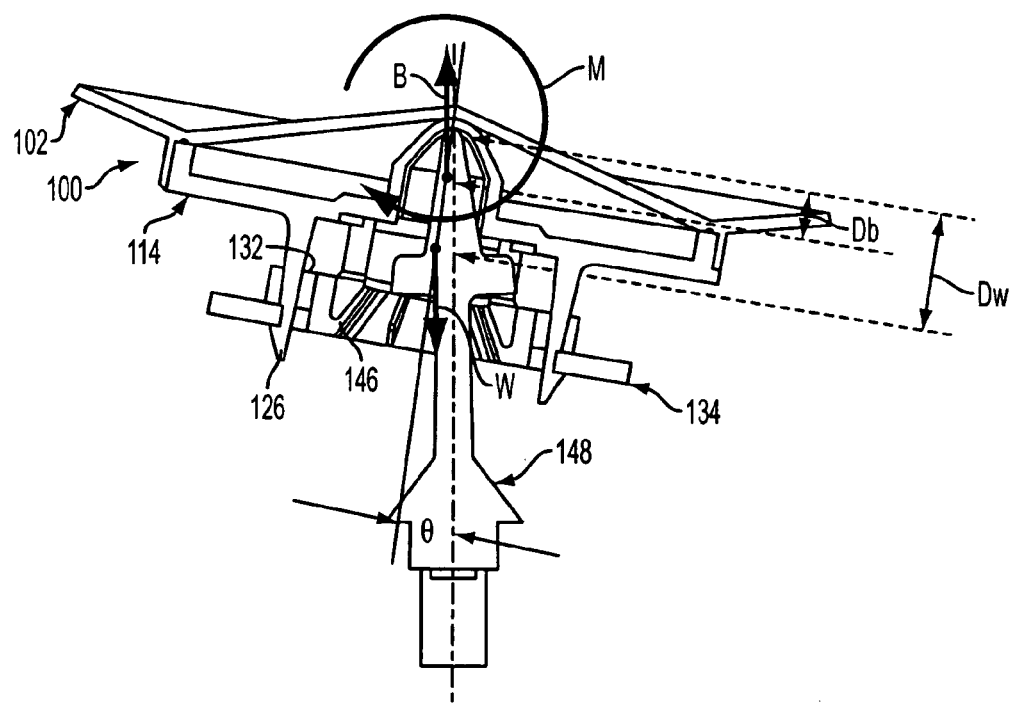
FIG. 9 is a cross-sectional view illustrating the forces acting on the compass card and pivot bar of FIG. 6 in use.

With specific reference to FIG. 9, next will be described an equilibrium equation which explains the functioning of the compass formed of the compass card assembly 100, retaining assembly 134 and pivot assembly 148 illustrated in FIGS. 6–8. The equilibrium equation is:

$$M=(W*D_w-B*D_b)*\sin\theta$$

where M is the vertical geomagnetic moment, W is the weight, $D_w$ is the distance from the center of gravity to the pivot point 154, B is the buoyancy, $D_b$ is the distance from the center of buoyancy to the pivot point 154, and $\theta$ is the angle of dip.

Figure 10:
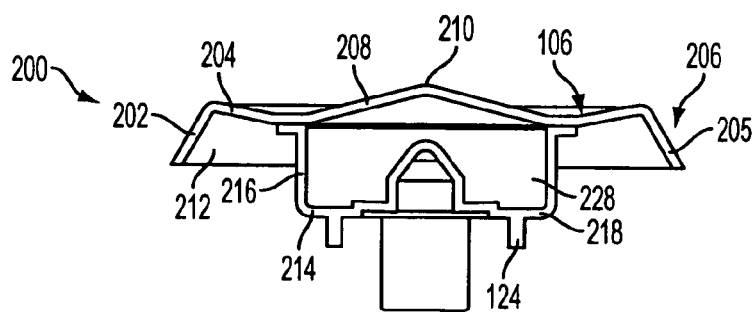
FIG. 10 is cross-sectional view illustrating a dual read compass card constructed in accordance with another exemplary embodiment of the invention.
Figure 11A:
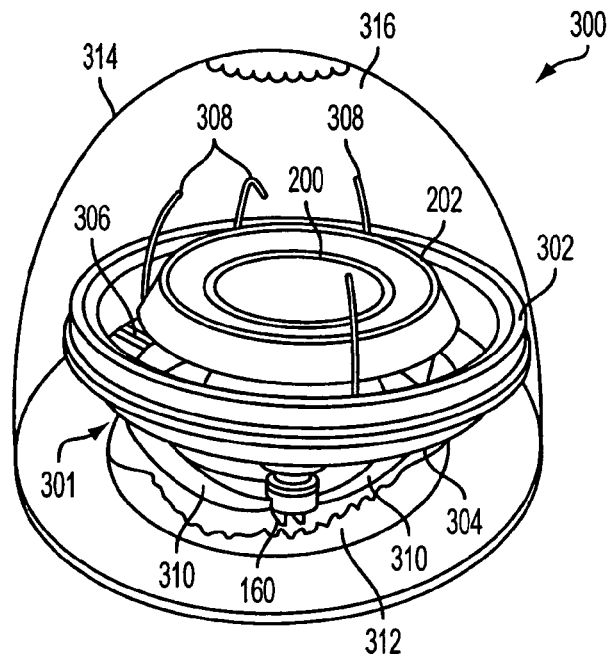
FIGS. 11a and 11b are perspective views of a compass including the compass card of FIG. 10.
Figure 11B:
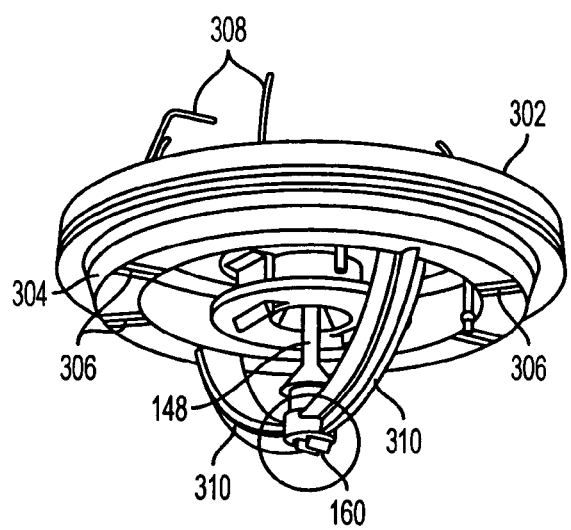

Referring to FIGS. 10, 11a and 11b, next will be described a compass 300 that includes a compass card assembly 200 with an upper card 202 and a lower card 214. As shown in FIG. 10, the upper card 202 includes a first wing surface 204 and a second wing surface 205. Dial readings 106 may be read on the first wing surface 204, while dial readings 206 may be read on the second wing surface 205. An inclined surface 208 extends from the first wing surface 204 to an apex 210. The inclined surface 208 is shorter than the inclined surface 108 illustrated in FIGS. 6–9. A first flange 212, which is shorter than the first flange 112 (FIGS. 6–9), extends down from the first wing surface 204.

The lower card 214 includes a base 218 from which a second flange 216 extends. The second flange 216 fits within the first flange 112, and the base 218, second flange 216 and inclined surface 208 form an air chamber 228.

The compass 300 further includes a gimbal assembly 301 and a cup 312, both within a dome 314. The gimbal assembly 301 includes an outer gimbal ring 302, an inner gimbal ring 304 and gimbals 310. The gimbals 310 extend radially inwardly from the inner gimbal ring 304 to form a semicircular frame having an opening at a lower position thereof. The inner gimbal ring 304 includes a plurality of slots 306. Lubbers lines 308 may be located in the slots 306 and extend up over the outer gimbal ring 302. The pivot assembly 148 fits within the gimbal assembly 301 by snap fitting the latches 160 into the opening at the lower position of the gimbals 310. The gimbal assembly 301 fits within the cup 312, and the entire compass assembly is placed within the dome 314 filled with a fluid 316, preferably a transparent oil. The cup 312 and the fluid 316 allows the gimbal assembly 301 to tilt at angles up to almost 90 degrees. The structure of the present invention allows the compass housing, including the dome 314 and the cup 312, to dip at large angles without influencing the compass card assembly 200. Because the compass card assembly 200 freely pivots on the pivot assembly 148 which is attached to the gimbal assembly 301, the compass card 200 is further decoupled from minor movements of the gimbal assembly 301. The compass card assembly 200 can maintain an upright and readable orientation during full-of-motion marine conditions, thereby allowing for large dips of the gimbal assembly 301 with little or no effect on the dip of the compass card assembly 200.

Figure 12:
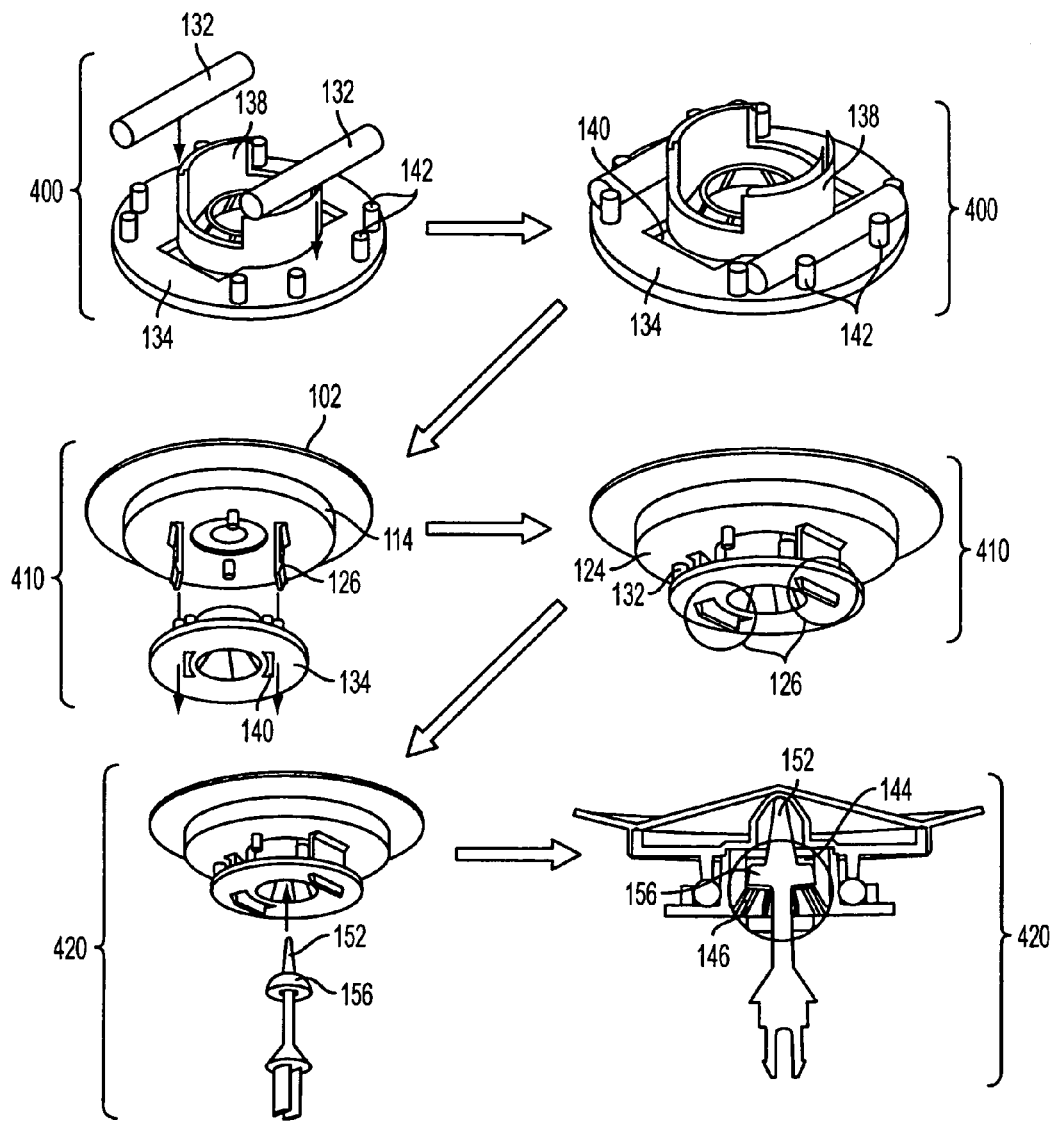
FIG. 12 illustrates the assembly of compass card and pivot bar of FIG. 6.
Figure 13:
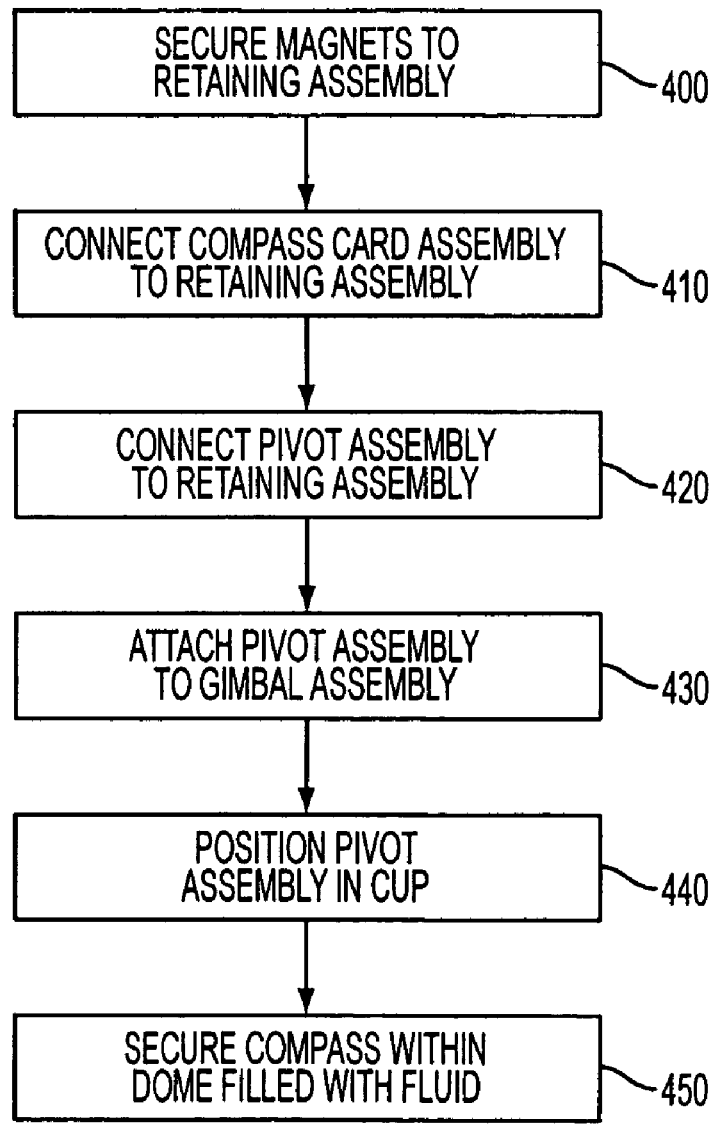
FIG. 13 illustrates the assembly of a compass in accordance with an exemplary embodiment of the invention.

Referring specifically to FIGS. 12 and 13, now will be described a method of assembling the compasses illustrated in FIGS. 6–11b. At Step 400, the magnets 132 are secured against the retainers 142 on the retaining assembly 134. As illustrated, the ends of the magnets 132 fit between a pair of retainers 142, and the bodies of the magnets 132 fit between another pair of retainers 142 and the skirt 138.

Next, at Step 410, the compass card assembly 100 is connected to the retaining assembly 134. The compass card assembly 100, which includes the upper card 102 and the lower card 114 sealed to one another, is attached to the retaining assembly 134 with the pair of hooks 126 extending through the openings 140 and latching to the underside of the retaining assembly 134. The protrusions 124 contact the magnets 132 to further inhibit the magnets 132 from moving from their berths between the retainers 142 and the skirt 138. The air chamber 128 bears the weight of the compass card assembly 100. Further, the placement of the magnets 132 beneath the air chamber 128 lowers the center of gravity of the compass card assembly 100.

At Step 420, the pivot assembly 148 is inserted into and retained by the retaining assembly 134. Specifically, the ledge 156 is snap-fit through the frusticonical section 146 into the chamber 144. The compass card assembly 100, 200 is now enabled to rotate about the pivot assembly 148 with some degrees of freedom to tilt (FIG. 9).

At Step 430 (FIG. 13), the pivot assembly 148 is attached to the gimbal assembly 301. Specifically, the latches 160 are snap-fit into the opening at the base of the gimbals 310. In this manner, the pivot assembly 148 is coupled to the gimbal assembly 301, however, the compass card assembly 100, 200 remains relatively decoupled from the movement of the gimbal assembly 301 and the pivot assembly 148.

At Step 440, the pivot assembly 148 is positioned in the cup 312, and the entire compass with the cup is secured within the dome 314 filled with the fluid 316 at Step 450. The air chamber 128, 228 provides buoyancy to the compass card assembly 100, 200 relative to the pivot assembly 148, and that buoyancy decouples the movement of the gimbal assembly 301 from the compass card assembly 100, 200. Because the compass card assembly 200 freely pivots on the pivot assembly 148 which is attached to the gimbal assembly 301, the compass card 200 is decoupled from the gimbal assembly 301. The compass card assembly 200 can maintain an upright and readable orientation, thereby allowing for large dips of the gimbal assembly 301 with little or no effect on the dip of the compass card assembly 200.

The no-spin mechanism of the compass of the invention will now be described. Upon submerging the compass card assembly 100, 200 within the fluid 316, the air chamber 128 serves to make the compass card assembly 100, 200 almost neutrally, but slightly negatively buoyant (i.e., buoyancy is less than weight). Thus, the contacting force between the cone 120 of the base 118 and the cone 152 of the pivot assembly 148 is rendered small so that the compass card assembly 100, 200 will not be dragged by the friction to spin when it is subjected to vibration.

Next will be described the self-balancing mechanism. The compass card assembly 100, 200 is designed such that its center of buoyancy is higher than its center of gravity, due primarily to the positioning of the magnets 132 below the air chamber 128. When subjected to the vertical component of the geomagnetic force, the weight and the buoyancy of the compass card assembly 100, 200 provide a counteracting moment to hold the compass card assembly 100, 200 upright. The magnitudes of the weight, buoyancy and height relative to the pivot point 154 are designed to limit the maximum dip by geomagnetism around the world to a visually non-discernable angle.

While the invention has been described in detail in connection with exemplary embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A marine compass comprising:
    a pivot assembly having at least one pivot point;
    a retaining assembly over said pivot assembly, said retaining assembly at least partially retaining at least one magnet;
    a card assembly over said retaining assembly, said retaining and card assemblies having a center of gravity and a center of buoyancy; and
    wherein a distance between said center of gravity and said pivot point is greater than a distance between said center of buoyancy and said pivot point, and wherein said pivot point is above said center of gravity and said center of buoyancy.

2. The marine compass of claim 1, wherein said card assembly is negatively buoyant in a fluid.

3. The marine compass of claim 1, wherein said pivot assembly engages a cavity of said card assembly such that said card assembly substantially freely pivots on said pivot assembly, and frictional drag between said pivot assembly and said cavity is such that said card assembly substantially does not spin due to movement of said pivot assembly.

4. The marine compass of claim 1, wherein said retaining assembly and said card assembly comprise a buoyant-magnetic assembly having a center of buoyancy and a center of gravity, wherein said center of buoyancy is higher than said center of gravity.

5. A no spin, self-balancing marine compass, comprising:
    a pivot assembly having a pivot point;
    a retaining assembly over said pivot assembly, said retaining assembly at least partially retaining at least one magnet; and
    a card assembly over said retaining assembly, said card assembly comprising a gas chamber,
    and wherein said pivot point pivotally directly engages said card assembly at said gas chamber.

6. The marine compass of claim 5, wherein said card assembly is engaged with said retaining assembly.

7. The marine compass of claim 5, wherein said gas chamber has a cavity engaged with said pivot point, such that said card assembly substantially freely pivots on said pivot assembly.

8. The marine compass of claim 7, wherein a frictional drag between said pivot point and said cavity is such that said card assembly substantially does not spin due to movement of said pivot assembly.

9. The marine compass of claim 5, further comprising a housing and a dome encompassing said pivot assembly, said retaining assembly and said card assembly, said dome being at least partially filled with a fluid.

10. The marine compass of claim 9, wherein said card assembly is negatively buoyant in said fluid.

11. The marine compass of claim 9, wherein said retaining assembly and said card assembly comprise a buoyant-magnetic assembly having a center of buoyancy and a center of gravity, wherein said center of buoyancy is higher than said center of gravity.

12. A marine compass, comprising:
   a pivot assembly having a pivot surface;
   a buoyant-magnetic assembly positioned over said pivot assembly, wherein said buoyant-magnetic assembly comprises a gas chamber, and wherein said buoyant-magnetic assembly has a center of buoyancy and a center of gravity; and
   wherein a distance between said center of gravity and said pivot surface is greater than a distance between said center of buoyancy and said pivot surface, and wherein said pivot surface is above said center of gravity and said center of buoyancy.

13. The marine compass of claim 12, wherein said buoyant-magnetic assembly further comprises a card assembly over said gas chamber.

14. The marine compass of claim 13 further comprising a retaining assembly engaged with said card assembly.

15. The marine compass of claim 12, wherein said buoyant-magnetic assembly comprises at least one magnet below said gas chamber.

16. The marine compass of claim 15, further comprising a magnet anchoring assembly which includes a plurality of stanchions surrounding said magnet.

17. The marine compass of claim 12, further comprising fluid within said housing.

18. The marine compass of claim 17, wherein said buoyant-magnetic assembly has a center of buoyancy and a center of gravity, said center of buoyancy being higher than said center of gravity.

19. The marine compass of claim 17, wherein said buoyant-magnetic assembly is negatively buoyant in said fluid.

20. The marine compass of claim 12, wherein said pivot assembly engages said buoyant-magnetic assembly, and a frictional drag between said pivot assembly and said buoyant-magnetic assembly is such that said buoyant-magnetic assembly substantially does not spin due to movement of said pivot assembly.

* * * * *